United States Patent
Bourgeois

[15] 3,642,410
[45] Feb. 15, 1972

[54] MACHINE FOR MOULDING HOLLOW PLASTIC ARTICLES BY BLOWING

[72] Inventor: Jacques Bourgeois, Lyon, France
[73] Assignee: Lesieur-Cotelle, Societe Anonyme, Seine, France
[22] Filed: Mar. 17, 1969
[21] Appl. No.: 807,596

[30] Foreign Application Priority Data
Mar. 18, 1968  France .................................. 144213

[52] U.S. Cl. ........................... 425/326, 100/226, 425/387
[51] Int. Cl. ..................................................... B29d 23/03
[58] Field of Search ............... 18/5 BE, 5 BC, 30 LM, 30 LC, 18/5 BJ, 5 BP, 5 BM, 5 BA, 5 BR, 5 BB; 100/295, 226

[56] References Cited

UNITED STATES PATENTS

| 812,228 | 2/1906 | Von Philp | 100/226 |
|---|---|---|---|
| 2,439,725 | 4/1948 | Frost | 100/226 |
| 3,154,809 | 11/1964 | Fischer | 18/5 BP |
| 3,160,919 | 12/1964 | Carter | 18/17 J |
| 3,265,788 | 8/1966 | Arlo | 18/5 BH X |
| 3,388,657 | 6/1968 | Jureit | 100/226 |

Primary Examiner—Robert D. Baldwin
Assistant Examiner—Michael O. Sutton
Attorney—Robert E. Burns and Emmanuel J. Lobato

[57] ABSTRACT

Machine for moulding plastic hollow articles by blowing, which comprises a movable support on which at least one mould consisting of two sections is mounted, at least one of said mould sections being detachably mounted on a mould carrier tray slidably mounted on said movable support and adapted to cooperate with the other mould section fixedly or movably mounted on said support, each tray provided with a movable mould section being operatively connected to the piston rod of a fluid-actuated clamping cylinder mounted on said support so as to control the opening and closing of the two mould sections, characterized in that the position of each clamping cylinder on said movable support is adjustable transversely, that is to say in a direction parallel to the joint plane of the two mould halves in order to vary the axis of application of the thrust exerted by the clamping cylinder on the movable mould carrier as a function of the dimension and/or shape of the mould impression.

1 Claim, 3 Drawing Figures

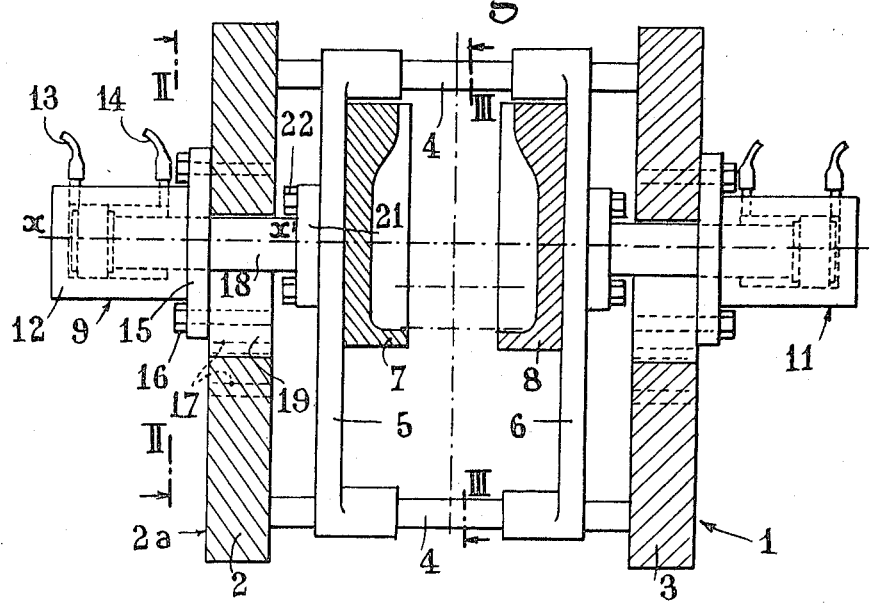
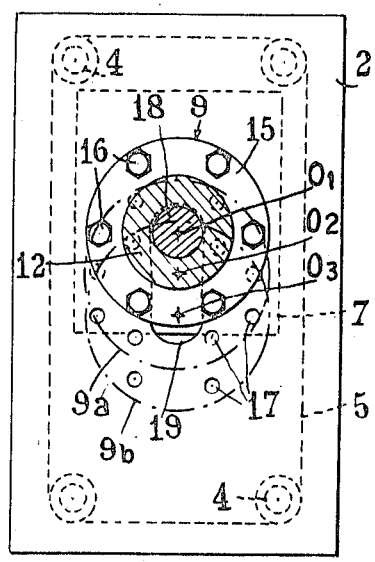
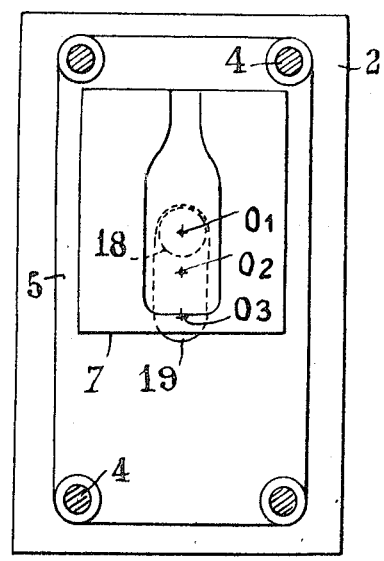

MACHINE FOR MOULDING HOLLOW PLASTIC ARTICLES BY BLOWING

BACKGROUND OF THE INVENTION

The present invention relates to improvements in or relating to machines designed for moulding hollow plastic articles by blowing.

Various machines are already known which are capable of moulding hollow articles of plastic material by combined blowing and extrusion. As a rule, these machines comprise in addition to a conventional extruder one or a plurality of moulds mounted on a support adapted to be driven in translation or rotation either continuously or intermittently. Each mould consists of two halves or sections and at least one of the half moulds is slidably mounted on the mould support under the control of a clamping cylinder adapted to open and close the moulds.

Some machines are designed with a view more particularly to permit the moulding of articles having different dimensions. To this end each half mould is secured in an easily detachable manner to a mould-supporting tray, or to the aforesaid support proper.

The line of action along which the mould closing force is exerted should be properly located in relation to the mould. In fact, the mould closing problem should be examined from a dual point of view.

On the one hand, if the mould closing force has to overcome only the resultant pneumatic force tending to open the mould during the blowing phase, it would be desirable to cause the lines of action of these two forces to be coincident.

On the other hand, the closing force may have the additional function of making weld seams and cutting lines in the plastic material on one portion of the joint plane of the mould. When these weld seams and cutting lines are developed in the longitudinal direction, for example in the case of containers provided with a handle or the like, a relatively substantial force is required; it is therefore desirable, from this single point of view, to cause the line of action of the closing force to be coincident with the line of action of the resultant of the forces required for making said weld seams and cutting lines.

When considering these two problems as a whole, it appears that a judicious comprise between these two requirements would desirably consist in disposing the line of action of the mould closing force in relation to the mould.

In the general case of blow-moulding machine it is not possible to displace the mould in relation to the mould closing force, since the mould position is controlled by requirements such as the position of its upper portion.

SUMMARY OF THE INVENTION

The present invention relates to an improvement in a moulding machine of the type set forth hereinabove, with a view to permit the proper moulding of articles having very different dimensions and shapes by using a same moulding assembly, by virtue of a suitable variation in the axis along which the effort is exerted by the mould clamping cylinder.

To this end, the machine according to this invention for moulding hollow articles of plastic material by blowing, which comprises a movable support on which at least one mould consisting of two halves, sections or like portions is mounted, at least one of the mould halves being detachably fastened to a mould-supporting tray slidably mounted on said movable support and cooperating with the other mould half fixedly or movably mounted on said support, each half- mould-supporting tray being coupled to the piston rod of a clamping cylinder mounted on said support for controlling the opening and closing of said mould halves, is characterized in that the position of the clamping cylinder is adjustable in a transverse direction, i.e., parallel to the joint plane of the two mould halves, in order to vary at will the axis along which the clamping cylinder thrust is exerted on the movable mould support as a function of the dimension and/or shape of the mould impression.

Thus, by using the device of this invention, it is possible to adjust the position of the clamping cylinder axis as a function of the mould dimension and/or the shape of the impression for moulding the article therein, so as to ensure the optimum distribution of the clamping effort along the joint plane.

BRIEF DESCRIPTION OF THE DRAWING

In the attached drawing a typical form of embodiment of the present invention is illustrated diagrammatically by way of example:

FIG. 1 illustrates in longitudinal section a mould and its support;

FIG. 2 is a cross section taken along the line II—II of FIG. 1;

FIG. 3 is a cross section taken along the line III—III of FIG. 1. The moulding machine to which this invention is applicable may be of any known type, notably of the oscillating bed type, or of the type wherein the mould support is reciprocated vertically or horizontally, or rotated continuously or intermittently.

DESCRIPTION OF THE PREFERRED EMBODIMENT

Only those elements of the machine which are necessary for a proper understanding of the invention are illustrated in FIG. 1. The machine comprises a movable moulding unit designated by the reference numeral 1, which consists essentially of a pair of transverse frame members 2 and 3 constituting the mould support movable either in translation or in rotation, these frame members being braced by parallel columns 4 on which a pair of mould carrier trays 5 and 6 are slidably mounted. Two mould halves 7 and 8 formed with an impression corresponding to the shape of the object to be moulded are secured in registering relationship on said trays 5 and 6, respectively. This object is formed from a plastic parison section delivered vertically between the two mould halves 7 and 8 by an extruder (not shown in FIG. 1), and subsequently blown within the mould to the proper configuration by a conventional blowing device (not shown).

The opening and closing movements of the mould halves or sections 7 and 8 is controlled by a pair of clamping cylinders 9 and 11 secured to the external face of frame members 2 and 3 respectively.

Since the mountings of the two clamping cylinders 9 and 11 is identical, only one of them will be described in detail, in this case the mounting of cylinder 9. This cylinder is of the double-acting hydraulic or pneumatic type and comprises a main body 12 connected by pipelines 13 and 14 to a source of fluid under pressure (not shown) and comprises at its inner end a circular flange 15 through which emerges the piston rod 18 of the cylinder. Said flange 15 is secured to the outer transverse face 2a of frame member 2 and has formed therethrough a plurality of equiangularly spaced plain holes disposed on a circle concentric to the axis $x-x'$ of cylinder 9, and adapted to receive-fastening screws 16 engaging tapped holes 17 formed in frame member 2. The piston rod 18 of cylinder 9 extends through an elongated hole 19 formed through this frame member 2 and has its inner end secured to the mould-carrier tray 5, for example by means of a connecting flange 21 and screws 22.

As better shown in FIG. 2, the cylinder 9 can be mounted on the frame member 2 in any one of three separate positions shifted transversely to one another, namely an upper position 9 shown in thick lines, and two other positions shown in dash and dot lines, i.e., an intermediate position 9a and a lower position 9b. To this end the frame member 2 has formed therethrough three sets of holes 17 (for example six holes per set) equitriangularly spaced on circles about three centers denoted $0_1$, $0_2$ and $0_3$ respectively. In the upper position the axis $x-x'$ of cylinder 9 is coincident with the center $0_1$ of the upper set of holes 17, and with the center $0_2$ and $0_3$ respectively when the cylinder has its axis disposed in the intermediate or lower positions 9a or 9b, respectively.

The mould-carrier tray 5 has also formed therethrough three sets of holes disposed on three circles in such a manner that the rod 18 of cylinder 9 can be coupled with said tray 5 in any one of the above-defined three separate and transversely shifted positions. Under these conditions, by modifying the position of cylinder 9 on the transverse frame member 2 and consequently the position in which its position rod 18 is secured to the mould carrier tray 5, it is possible to vary the point of application of the force exerted by the cylinder 9 as a function of the dimension of the half mould 7. In the drawing it is assumed that the device is associated with a mould of relatively moderate height, so that the clamping cylinder is set in its upper position and the axis $x-x'$ along which the clamping force is applied is coincident with the uppermost center $0_1$. Of course, the same applies to the opposite clamping cylinder 11.

It is clear that when the moulding device is to be used with a mould having a greater height, which is permitted by the relatively substantial height of the mould carrier trays 5 and 6, the clamping cylinder is mounted in its intermediate position $9a$ or in its lower position $9b$, according to the height of the mould half 7.

Under these conditions the position of the axis or line of force of each mould clamping cylinder can be adapted to the mould size and possibly to the shape of the impression for moulding the object.

If desired, each mould carrier tray 5 or 6 may carry a single half mould, as illustrated in the drawing, or a plurality of adjacent half moulds, according to the type of machine and production requirements.

Of course, it will be readily understood by those conversant with the art that the specific form of embodiment of the invention which is shown in the attached drawing and described hereinabove is given by way of illustration only and should not be construed as limiting the present invention since many modifications may be brought thereto without departing from the spirit and scope of the invention as set forth in the appended claims.

Thus, notably, the clamping cylinders 9 and 11 may be mounted on the frame members 2 and 3 but internally thereof. In this case the cylinders 9 and 11 would be secured by their bottoms (instead of by their nose or rod end) and the frame members 2 and 3 would not require the aforesaid elongated holes 19 for permitting the passage of the piston rod therethrough.

Besides, although in the example described hereinabove and illustrated in the drawing the two half moulds 7 and 8 are movable on the frame members 2 and 3, one of them could be mounted in a fixed position on the support, i.e., directly on one of said frame members 2 or 3.

The number of positions in which the mould-closing cylinder 9 can be set on the frame member is not necessarily three, as shown by way of example, and if desired, these positions may be not aligned with each other; furthermore, they can be selected according to requirements, i.e., according to the number of positions contemplated.

What I claim is:

1. A machine for molding hollow plastic articles by combined extrusion and blowing, which comprises a movable support, at least one mold consisting of two half molds which is mounted on said movable support, at least one mold carrier tray slidably mounted on said movable support, one of said half molds being detachably secured to said mold carrier tray and adapted to coact with the other half mold mounted on said support, at least one clamping cylinder comprising a piston rod, which is mounted on said support in order to control the mold opening and closing movements, each tray provided with a detachable half mold being operatively connected to the piston rod of the clamping cylinder on said movable support and means for permitting a variation, in a direction parallel to the joint plane of said half molds, in the position of the axis of application of the thrust exerted by said clamping cylinder against the movable mold carrier as a function of the mold impression, which comprises a plurality of sets of holes formed through said movable support and said mold carrier tray, each set of holes being shifted transversely in relation to the other sets, and clamping cylinder fastening screws engaging one of said sets of holes.

* * * * *